July 29, 1958   C. D. CURTIS ET AL   2,845,560
NEUTRON COUNTER
Filed Aug. 31, 1954

INVENTOR.
Cyril D. Curtis
Robert L. Carlson
Matthew P. Tubinis
BY:
ATTORNEY

United States Patent Office 2,845,560
Patented July 29, 1958

2,845,560

NEUTRON COUNTER

Cyril D. Curtis, Nashville, Tenn., Robert L. Carlson, Long Beach, Calif., and Matthew P. Tubinis, Aiken, S. C., assignors to the United States of America as represented by the United States Atomic Energy Commission Application August 31, 1954, Serial No. 453,450

11 Claims. (Cl. 313—61)

This invention relates to an improved ionization chamber instrument for measurement of particles and radiation emanating from radioactive materials and in particular to a device used for extremely localized measurement of neutron flux.

One type of present day counters used for neutron flux measurements utilizes an outer hollow electrode which is coated on the inside with a neutron-responsive material to cause ionization of gas within the hollow, or the space within the electrode is filled with neutron-responsive gas which ionizes when subjected to neutron irradiation. Concentrically located within this hollow electrode is another electrode which in conjunction with the outer electrode forms an electric field therebetween when a source of potential is connected across the electrodes.

One of the main disadvantages of using a conventional counter lies in the fact that the ionization pulses produced within such a counter are not uniform in amplitude. The non-uniformity of pulse amplitude is primarily due to the randomness of the direction in which the ionizing radiations are emitted by the active material coated on the inside of the outer electrode. Emission of fission fragments or alpha particles, as the case may be, by the active material due to neutron bombardment occurs substantially in all all directions at the point of neutron impact on the active material. Some of the product of the impact is emitted towards the center of the chamber, and the rest of the product is emitted along various chords of the cross-sectional circle described by the outer cylindrical electrode, the tangent to said circle forming the extreme limit of the emission path possibilities which will produce any ionization in the chamber. Pulses of maximum amplitude are obtained from the particles which are emitted radially toward the center electrode. The amplitude of pulses produced by mono-energetic particles having other emission paths will vary in the range extending from the maximum value, described above, to zero value depending upon the length of the chord over which the particle traverses the ionization chamber.

An object of the present invention is to provide a neutron counter which utilizes a unique structure which is conducive to uniform ionization in its chamber to produce uniform amplitude pulses for measurement purposes.

Another object of the invention is to provide a neutron counter which is substantially independent of voltage variations impressed across its electrodes in the operating range.

Other objects and advantages will become more apparent from a study of the following description taken in conjunction with the accompanying drawing consisting of two figures.

Figure 1:
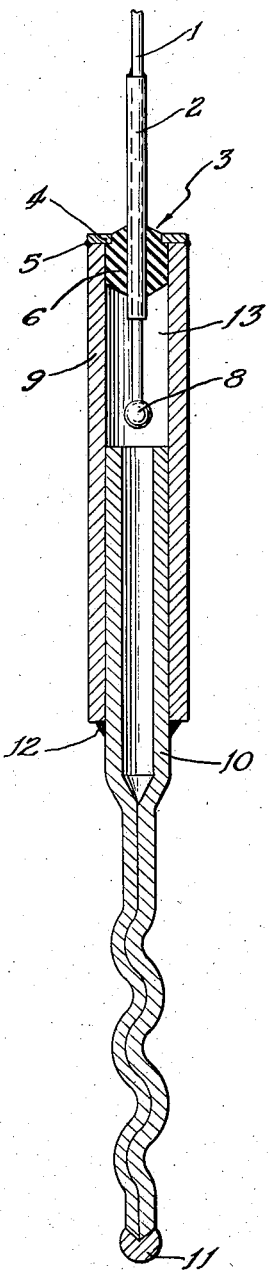
Figure 1 shows a cross-section view of the neutron counter embodying the teachings of this invention.
Figure 2:
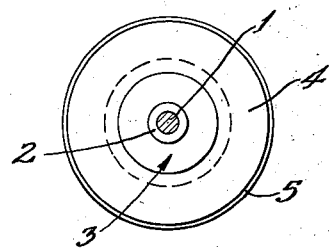
Figure 2 shows an end view of the base of the neutron counter.

Referring to Figure 1, the fission counter comprises a hollow tube 9 having a glass to metal hermetic feed-through assembly 3 firmly secured to one end of the tube 9. The feed-through assembly 3 comprises a feed-through metal tubing 2 passing through a ceramic seal 6 which is embedded on a base washer 4. A central electrode 1 passes through the feed-through tubing 2 and extends partially into a chamber 13 of the tube 9. The feed-through tubing 2 functions to provide a passage for the central electrode 1 and also to provide a means of support within the hollow tube. The feed-through metal tubing is insulated by the ceramic seal 6 from the base washer 4 so that an electric field may be established between the central electrode 1 and the inner wall of the tube 9. The feed-through assembly 3 is hermetically sealed and attached to the tube 9 by means of a soft-solder joint indicated as 5. The hollow tube 9 is made of metal, preferably stainless steel, to allow ease of penetration by the neutron flux. A filling tube 10, which has its outer diameter equal to the inner diameter of the tube 9, is inserted at the other end of the tube 9 and soldered at the points 12. The filling tube 10 has its outer extremity crimped and sealed by soft-solder at point 11. The filling tube 10 is also made of metal, preferably copper. The central electrode 1 which passes through the feed-through tubing 2, has its extremity beaded so that it offers no sharp edges or corners to avoid sharp voltage gradients within the chamber 13 of the tube 9 thereby avoiding ionization due to corona discharges in the gas entrapped in the chamber.

Before the outer extremity of the filling tube 10 is crimped, the chamber of the tube 9 as well as the chamber of the tube 10, is evacuated and then filled with gas under high pressure. The junction between the central electrode 1 and the feed-through tubing 2 is filled with soft-solder to provide a hermetic seal and prevent the escape of gases found in the chamber of the counter. The surface of the central electrode 1, which is contained within the chamber of the tube 9, is coated with an active material which is responsive to neutron bombardment, such as uranium or boron, to produce ionizing radiations of the gas within the chamber of the counter. The amount of material coated on the active portion of the central electrode 1 can be adjusted to achieve a desired range of neutron sensitivity. Other fissionable materials besides $U^{235}$ may be used such as $Pu^{239}$, $Np^{237}$, $U^{238}$, and $Th^{232}$.

A suitable voltage is impressed across the central electrode 1 and the tube 9 to form an electric field between the inner wall of tube 9 and the exposed portion of the central electrode within the chamber 13. The presence of neutron radiation will cause fission fragments (or alpha particles, in the case of boron) to be emitted from the coating on the active portion of the central electrode 1. These fragments will in turn ionize the gas in chamber 13.

The objectionable large variation of pulse amplitude is overcome in the present invention by utilizing a central electrode which is coated with neutron-responsive material. The important advantage of coating the central electrode, rather than the inner walls of the hollow electrode, is that there is produced in the counter in response to neutron irradiation, a series of ionizing pulses which are far more uniform in amplitude than in the case of a conventional counter. The reason for this is that all of the energy of the ionizing particles emitted as a result of neutron irradiation (fission fragments where $U^{235}$ is employed or alpha particles where boron is employed) is expended in the active gas volume of the counter thereby producing ionizing pulses which are more nearly uniform than in the conventional counter. Where the coating of active material is placed centrally, as in the device of the present invention, the large variation in pulse amplitude is substantially eliminated, since any particle emitted from the coating on the central electrode will produce ionization in the chamber volume which is essentially proportional to the original energy of the particle, and which is essentially independent of the direction in which the particle is emitted (except, of course, that particles emitted radially inwardly of the central electrode will be completely absorbed).

The counter structure described herein produces a relatively long plateau in the curve of number of pulses counted versus bias or discriminator setting of the pulse-height selector with which such counters are universally employed. The advantages of the length of such plateau are well known, one of these being to reduce errors due to instabilities in the bias or discriminator setting and in any amplifiers which are employed to amplify the pulses prior to feeding them into the pulse-height discriminator.

Variations of counter volume, coated area and thickness of coating were used in combinations to achieve a wide range of sensitivity. The counter volumes of different designs varied from approximately 0.07 cc. to 0.5 cc. The amount of material coated on the central electrodes of the counters was adjusted to give a range in neutron sensitivity. The amount of neutron-responsive material that was deposited on the central electrode varied from less than 0.02 to 0.2 milligram per square centimeter. In a thermal neutron flux, the $U^{235}$ counters, which have been designed primarily for measuring fast neutrons, had efficiencies varying from approximately $10^{-9}$ percent to $10^{-4}$ percent.

Of the multitude of counters that were constructed, physical dimensions of one of the smaller counters will be indicated herein to give an idea of its small compact size. Typical dimensions of the neutron counter shown in the drawing are as follows: The central electrode 1 is a 0.027 inch diameter copper wire supported by a glass metal hermetic feed-through assembly 3. The tube 9 is a 0.187 O. D. x 0.125 I. D. x 0.875 inch long stainless steel tube in which is soft-soldered a pinched-off copper filling tube 10. The over-all length of the counter as measured from the base of said counter to the extremity of the filling tube 10 is 1.375 inches.

The present structure because of its small dimensions offers an additional advantage where it is desired to make extremely localized measurements of neutron flux. In a conventional counter, the neutron flux measured thereby can not be localized more exactly than the over-all dimensions of the outer electrode, whereas with the present structure, variations in neutron flux over much smaller distances can be detected and measured.

While there has been described what is at present considered to be the preferred embodiment of the invention, it will be understood that various modifications may be made therein and it is intended in the appended claims to cover all such modifications as found within the true spirit and scope of the invention.

What is claimed is:

1. A neutron counter comprising two coaxial cylindrical electrodes with ionizing gas therebetween, only the inner of said electrodes being coated with a material producing ionizing radiations in response to neutron bombardment whereby substantially all the ionizing radiations are directed toward the outer electrode.

2. A neutron counter comprising two electrodes, one electrode within the other electrode and separated by ionizing gas under high pressure, and a layer of neutron-responsive material forming a coat over the inner electrode to produce ionizing radiations in response to neutron bombardment whereby substantially all ionizing radiations are directed toward the outer electrode.

3. A radiation counter comprising two coaxial cylindrical electrodes having an ionizing gas therebetween, only the inner of said electrodes being coated with a material producing ionizing radiations in response to radiation and particle bombardment whereby substantially all the ionizing radiations are directed toward the outer electrode.

4. The radiation counter as described in claim 3 wherein the material coated on said inner electrode comprises a compound of uranium isotope 235.

5. The radiation counter as claimed in claim 3 wherein the material coated on the inner electrode comprises a compound of boron isotope 10.

6. The radiation counter as claimed in claim 3 wherein the material coated on the inner electrode comprises a compound of plutonium isotope 239.

7. The radiation counter as claimed in claim 3 wherein the material coated on the inner electrode comprises a compound of neptunium isotope 237.

8. The radiation counter as claimed in claim 3 wherein the material coated on the inner electrode comprises a compound of thorium isotope 232.

9. A neutron counter comprising two electrodes, one electrode within the other electrode and separated by ionizing gas under high pressure, and a layer of material on said inner electrode responsive to radiation and particle bombardment to produce ionizing radiations in said gas whereby substantially all the ionizing radiations are directed toward the outer electrode.

10. A neutron counter comprising a hollow electrode and an inner electrode protruding partially into the chamber of said hollow electrode, a coating of neutron-responsive material covering the portion of said inner electrode protruding within the outer electrode to produce ionizing radiations, said hollow electrode being free of a neutron responsive material coating, means for sealing one end of said hollow electrode and for supporting said inner electrode in a fixed spatial relationship to said hollow electrode, a filling in the chamber comprising ionizing gas under high pressure, and means having a bore coupled to the other end of the hollow electrode for providing an opening for admitting the filling, the ratio of the transverse cross section area of the inner electrode to the transverse cross section area of the chamber being substantially small, whereby substantially all the ionizing radiations initiated in the coating on the inner electrode are directed toward the outer electrode.

11. A radiation counter comprising a hollow tube made of material offering easy penetration to radiations, a central electrode protruding into said tube, a hermetic insulating seal positioning said central electrode within said tube and sealing one end of said tube, an ionizing gas under high pressure contained in said tube, a layer of material on said inner electrode, said material being responsive to radiation and particle bombardment to produce ionizing radiations in said gas, said hollow tube being free of a layer of said material, and a filling tube coupled to said hollow tube for admitting the gas, the transverse cross sectional area of the central electrode being substantially small with respect to the transverse cross sectional area of the chamber of the hollow tube whereby substantially all the ionizing radiations are directed toward the outer electrode.

References Cited in the file of this patent

UNITED STATES PATENTS

| | | |
|---|---|---|
| 2,408,230 | Shoupp | Sept. 24, 1946 |
| 2,440,167 | Broxon et al. | Apr. 20, 1948 |
| 2,696,564 | Ohmart | Dec. 7, 1954 |
| 2,736,812 | Weinstein et al. | Feb. 28, 1956 |
| 2,809,313 | Baer et al. | Oct. 18, 1957 |